United States Patent
Singla et al.

(10) Patent No.: US 10,104,112 B2
(45) Date of Patent: Oct. 16, 2018

(54) RATING THREAT SUBMITTER

(71) Applicant: HEWLETT PACKARD ENTERPRISE DEVELOPMENT LP, Houston, TX (US)

(72) Inventors: Anurag Singla, Sunnyvale, CA (US); Tomas Sander, Princeton, NJ (US); Edward Ross, Austin, TX (US)

(73) Assignee: Entit Software, LLC, Sanford, NC (US)

( * ) Notice: Subject to any disclaimer, the term of this patent is extended or adjusted under 35 U.S.C. 154(b) by 113 days.

(21) Appl. No.: 15/116,912

(22) PCT Filed: Apr. 18, 2014

(86) PCT No.: PCT/US2014/034590
§ 371 (c)(1),
(2) Date: Aug. 5, 2016

(87) PCT Pub. No.: WO2015/160357
PCT Pub. Date: Oct. 22, 2015

(65) Prior Publication Data
US 2017/0142147 A1   May 18, 2017

(51) Int. Cl.
*H04L 29/00* (2006.01)
*H04L 29/06* (2006.01)
*G06F 21/55* (2013.01)

(52) U.S. Cl.
CPC ........ *H04L 63/1433* (2013.01); *G06F 21/554* (2013.01)

(58) Field of Classification Search
CPC .......................... H04L 63/1433; G06F 21/554
See application file for complete search history.

(56) References Cited

U.S. PATENT DOCUMENTS

| | | | |
|---|---|---|---|
| 7,219,239 B1 | 5/2007 | Njemanze et al. | |
| 8,141,157 B2 | 3/2012 | Farley et al. | |
| 8,204,759 B2 | 6/2012 | Ashour et al. | |
| 9,152,739 B2 * | 10/2015 | Aasen | G06F 17/30867 |
| 9,461,972 B1 * | 10/2016 | Mehta | H04L 63/10 |
| 2003/0070070 A1 * | 4/2003 | Yeager | G06F 9/544 |
| | | | 713/157 |
| 2004/0133640 A1 * | 7/2004 | Yeager | G06F 9/4862 |
| | | | 709/204 |
| 2006/0101518 A1 | 5/2006 | Schumaker et al. | |
| 2007/0008408 A1 | 1/2007 | Zehavi | |
| 2008/0028469 A1 * | 1/2008 | Repasi | G06F 21/554 |
| | | | 726/24 |
| 2009/0178139 A1 | 7/2009 | Stute et al. | |
| 2010/0077481 A1 | 3/2010 | Polyakov et al. | |

(Continued)

OTHER PUBLICATIONS

Heather Howland, "Know Your Users: Using QRadar SIEM for User Activity Monitoring," Mar. 29, 2012, pp. 1-8, IBM.

(Continued)

*Primary Examiner* — Morshed Mehedi (57) ABSTRACT

Example embodiments disclosed herein relate to update a rating of threat submitters. Information is received of threat observables from threat submitters. Information about the threat observables is provided to one or more entities. Feedback about a threat observable is received from one of the entities. A rating of the threat submitter associated with the feedback is updated.

20 Claims, 4 Drawing Sheets

(56) References Cited

U.S. PATENT DOCUMENTS

| | | |
|---|---|---|
| 2011/0016513 A1 | 1/2011 | Bailey, Jr. |
| 2012/0066763 A1 | 3/2012 | McHugh et al. |
| 2014/0007190 A1* | 1/2014 | Alperovitch ........... G06Q 50/01 |
| | | 726/3 |
| 2014/0007238 A1* | 1/2014 | Magee ................... G06F 21/577 |
| | | 726/24 |
| 2014/0257991 A1* | 9/2014 | Christensen ....... G06Q 30/0241 |
| | | 705/14.66 |

OTHER PUBLICATIONS

International Search Report and Written Opinion, International Application No. PCT/US2014/034590, dated Jan. 13, 2015, pp. 1-8, KIPO.

\* cited by examiner

RATING THREAT SUBMITTER

BACKGROUND

Entities can maintain internal networks with one or more connections to the Internet. Internal networks include multiple resources connected by communication links, and can be used to connect people, provide services—both internally and externally via the Internet—and/or organize information, among other activities associated with an entity. Resources on the network can be susceptible to security attacks that originate either within the internal network or on the Internet. A security attack can include an attempt to destroy, modify, disable, steal, and/or gain unauthorized access to use of an asset (e.g., a resource, data, and information).

BRIEF DESCRIPTION OF THE DRAWINGS

The following detailed description references the drawings, wherein.

DETAILED DESCRIPTION

Entities can seek to avoid security attacks by identifying vulnerabilities in their networks. A vulnerability can include a flaw and/or weakness in the network's design, implementation, operation, and/or management that could be exploited to violate the network's security policy (e.g., a circumstance and/or event with the potential to adversely impact a network through unauthorized access, destruction, disclosure, and/or modification of an asset of the entity). An exploit can include computer-readable instructions, data, and/or a sequence of commands that takes advantage of a vulnerability to cause unwanted and/or unanticipated behavior. A security attack can include a use and/or attempted use of an exploit against a vulnerability. To avoid subsequent security attacks, an entity can perform an investigation (e.g., forensic investigation) to determine what exploits were used against what vulnerabilities during the security attack.

It can be beneficial for an entity to identify current security threats to a network associated with the entity, to information held by the entity, and/or to resources managed by the entity (e.g., computing devices, memory resources, processing resources). A security threat can include information that indicates the possibility of an impending security attack. The information can include information indicating a vulnerability and/or exploit, and/or information that an attack has occurred to another entity, among other information.

Entities face increasingly sophisticated, professional, organized, and well-funded security attacks on their information technology (IT) infrastructures. By quickly and accurately detecting, identifying, and/or addressing security threats, an entity may mitigate the effects of these security attacks. However, entities may find it increasingly difficult to quickly and accurately detect, identify, and/or address these security threat alerts on their own. Entities may currently identify security threat alerts by accessing a plurality of threat intelligence sources. The threat intelligence sources can, however, provide a vast amount of information and can result in a flood of security threats, most of the time without context. The security threats can lead to false positive security alerts that may take human resources to analyze and resolve. Encouraging entities to share information relating to security threats may improve the speed and/or accuracy in detecting emerging threats in part by adding context around the threat.

Entities can participate in a threat exchange community to identify security threats. For instance, a threat exchange community can include a group of computing systems that exchange information (e.g., data) related to information technology infrastructures (e.g., systems and services) via communication links. The computing systems can be referred to as participants of the threat exchange community. In some implementations, entities including and/or controlling the computing systems can also be referred to as participants of the threat exchange community. In some examples, a threat submitter is a participant in the threat exchange community that provides threat data. Further, in some examples, threat submitters may be considered one of the entities that receives data in the threat exchange community.

However, some data being received in the threat exchange community may be more useful than other data to the members of the community. Accordingly, various embodiments described herein relate to rating the members submitting data. The ratings can then be used to determine threat scores and/or threat alerts that go out to one or more members of the community.

Participants of the threat community can be rated based on automated tracking of utilization of the submitted security indicators in Security Information Event Management (SIEM) Systems. In one example, a threat management platform will monitor the usage of provided data through Rules in a SIEM system in an automated way. If the data gets utilized by the SIEM system, the ratings of the submitter will be upgraded. On the other hand, if the provided data does not correlate with security events in a subscriber's SIEM, the value/rating of the submitter can be degraded or not affected. This can be in addition to manual ratings and ratings based on quantity/uniqueness of data submitted. Such manual adjustments to ratings can be a constant and/or may be used to set a baseline from which automatic adjustments can update.

In one example manual ratings can be set because a controller of the threat exchange community knows that an entity has a significant investment in security and a capable team of support. As such, a baseline manual setting may be initiated at a high level. This can be in comparison to a small company with little security staff, which may receive a lower initial manual rating as a baseline. Moreover, in certain examples, updates to ratings may be manually adjusted based on how capable the controller determines the submitting entity to be. Manual adjustments may be used to over-ride the automated rating in certain instances. Moreover, in one example, the manual adjustment and/or baseline may be used as a variable and/or weighting in the automatic ratings system. As such, the rating of the threat submitters can be based on one or more of a manual rating set by an expert and/or another baseline rating, an automated rating based on feedback and other received information about the threat submitter such as the perception of the submitter by other entities.

Further, submitted indicators from one source can be correlated with indicators from other sources at a threat management platform. If information from a source augments the information from another highly rated source that can be used to also influence the rating of the source.

The ratings of the submitters may also be maintained based on communities. For example, data provided by a submitter may be utilized and/or correlated by Financial customers but not by Government customers. In this case, the rating of the submitter will be high for a Finance community but low for a Government community.

As such, some security threats that may be relevant to certain participant communities may not be relevant to other participant communities. For example, if a threat intelligence feed assigns reputation score to threat observables (e.g. Internet Protocol (IP) Addresses, Domains, File Hashes etc.), but it is the same value that is provided to all the subscribers of the service, some subscribers may find the value useful, while others may find the value to be a false positive or irrelevant based on community. Similarly, the submitter's rating can be affected based on the type of information the submitter provides that is used by the respective communities. A threat observable is information that can be observed by a device that can be used to make a determination that something (e.g., an event, an action, an IP address, a device, a set of events, a pattern, etc.) is malicious.

Figure 1:
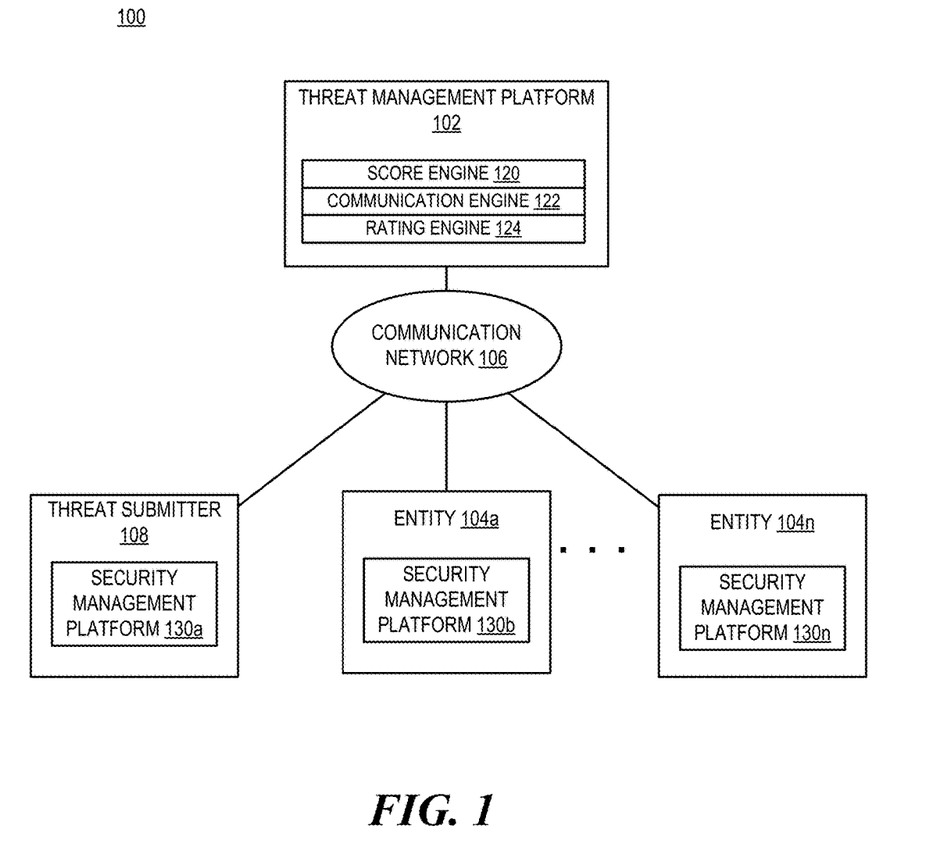
FIG. 1 is a block diagram of a threat exchange system capable of rating threat submitters, according to one example.

FIG. 1 is a block diagram of a threat exchange system capable of rating threat submitters, according to one example. The system 100 can include a threat management platform 102 that communicates with entities 104a-104n via a communication network 106. One or more of these entities can be considered a threat submitter 108. In certain examples, the threat management platform 102 and/or the entities 104a-104n, 108 can include a score engine 120, communication engine 122, rating engine 124, or security management platforms 130a-130n that are implemented using computing devices, such as servers, client computers, desktop computers, workstations, security appliances, security information and event management platforms, etc. In some embodiments, the security management platforms 130 can include special purpose machines. The score engine 120 and security management platforms 130 can respectively be implemented via a processing element, memory, and/or other components.

As described herein, the entities 104 and/or threat submitter 108 can be considered participants in the threat exchange community. Participants include a participant server or group of participant security management platform 130 within the IT infrastructure of each entity from a group of entities. Each participant security management platform 130 (or each group of participant servers) can provide information related to actions within or at the IT infrastructure including that participant security management platform 130 to the threat management platform 102.

The threat management platform 102 can analyze information provided by each participant security management platform 130 to identify security occurrences within the threat exchange community, and provide scores related to the threat observables to entities 104. As noted, these scores can be based on a rating of submitters of the threat observables.

In some examples, the threat observables can be based on a security occurrence. A security occurrence, as used herein, can include variables and information (e.g., data) that influence an action by the security management platforms 130. For example, such security occurrences that influence an action can include information describing a security context, a security attack, a security threat, a suspicious event, a vulnerability, an exploit, an alert, an incident, and/or other relevant events, identified using the participant provided information. Information can be correlated into scores for particular threat observables and can be customized to the particular security management platforms 130 of the respective entities 104. Examples of security management platforms 130 include an intrusion detection system, an intrusion prevention system, a security information and event management system, a firewall and the like.

Further, in various examples of the present disclosure, participants can be grouped into a plurality of clusters. The plurality of clusters can be dynamically formed based on participant provided characteristic data (e.g., infrastructure, size, industry), security data (e.g., host names, IP addresses, patch levels), and/or common security occurrence patterns identified (e.g., common security attacks, events, and incidents identified between participants). The clusters can affect ratings for threat submitters that are useful for that particular cluster. As noted, the ratings can be used to generate a threat score of a threat observable for the cluster and/or for particular participants.

The threat exchange community may also be a private community. Private communities are those communities that threat exchange participants manage by selecting specific entities that are allowed to participate. A threat exchange participant can be a member of one or more private communities in addition to other types of communities. In some examples, indicators and threat data shared within a private community is not shared with other communities. Ratings of members of the community can be accordingly weighted for the community(ies) it belongs to and/or other communities.

The plurality of entities 104a-104n can provide participant data to the threat management platform 102. The participant data can include security data and/or characteristic data. In one example, one of the entities is the threat submitter 108.

Security data, as used herein, can include security related information (e.g., IP addresses, host names, domains, URLs, file descriptions, application signatures, patch levels, behavioral descriptions of malware, personally identifiable information (e.g., email addresses, contact information, names, etc.), participant specific security information (e.g., system configurations, locations of participants, etc.), etc.). For instance, security data can include information that describes security occurrences. A security occurrence, as used herein, can include variables and information (e.g., data) that influence an action by the threat management platform. For example, such security occurrences that influence an action can include information describing a security context, a security attack, a security threat, a suspicious event, a vulnerability, an exploit, an alert, an incident, and/or other relevant events, identified using the participant provided information (e.g., the participant data). The various data involved with a security occurrence can each have an individual score. When correlating this data (including contextual data), a more precise credibility score can be derived.

Characteristic data can include data related to the participant, such as infrastructure data (e.g., operating systems used, versions of software used, known vulnerabilities associated with particular devices/software used, etc.), industry sector identification (e.g., banking, government, political, IT, etc.), and/or size of the entity, for example. In a number of examples, characteristic data can include historical security data identifying previous security occurrences identified by a participant. This can be used to determine one or more other characteristics of the participant including the credibility of data shared by that participant over time. This can be reflected, for example, in a threat submitter rating.

An event (or security event), as used herein, can include a description of something that has happened. An event may be used to describe both the thing that happened and the description of the thing that happened. For instance, an event can include information such as records within a log associated with the event. Examples of events include, "Alice logged into the machine at IP address 10.1.1.1", "The machine at IP address 192.168.10.1 transferred 4.2 gigabytes of data to the machine at IP address 8.1.34.2.", "A mail message was sent from email1 to email2 at 2:38 pm", "John Smith used his badge to open door 5 in building 3 at 8:30 pm", or "a new attack campaign has been initiated announcing a future threat". Events can contain a plurality of detailed data and may be formatted in a way that is computer readable (e.g. comma separated fields). In some examples, events do not correspond to anything obviously related to security. For instance, events can be benign.

An incident (or security incident) can be information that indicates the possibility that a security attack has occurred and/or is currently occurring. Unlike a security threat, which is about the future, an incident is about the past and present. An incident can include evidence of faulty play, an alert triggered by a system that detects malicious, suspicious or anomalous activity. Incidents can be investigated to determine if a security attack actually took place (in many cases an incident can be a false positive) and the root causes (e.g., what vulnerabilities and exploits were used).

An alert (or security alert), as used herein, can include an event that indicates the possibility of an attack. For instance, an intrusion detection system of a participant entity 104 and/or the threat management platform 102 can look for behaviors that are known to be suspicious and generate an event to that effect. Such an event (e.g., an alert) can have a priority associated with it to indicate how likely it is to be a security attack and/or how dangerous the observed behavior was.

Security context can include information that describes something about the participant (e.g., participant characteristic data), the overall threat level or score of a security occurrence, something about an individual or local threat environment, information about the global threat environment of the threat exchange community (e.g., increased activity of a particular type), and/or other useful information. Said differently, a security context describes and/or is the security-related conditions within the threat exchange community. As examples, a security context can describe or account for a security threat level within the threat exchange community, a qualitative assessment of the security attacks and/or security threats within the threat exchange community, activity and/or events within the threat exchange community, the IT infrastructure within the threat exchange community, incidents within the threat exchange community, information provided by a threat exchange server, information collected by a participant of the threat exchange community, and/or other security-related information. As a specific example, a security context can be defined by security occurrences within a threat exchange community. That is, the security context of a participant or the threat exchange community can be determined based on security occurrences identified within the threat exchange community.

The communication engine 122 can be used to receive threat data (e.g., threat observable) from one of the entities 104 and/or threat submitter 108. A score can be generated by the score engine 120 for the threat data. The communication engine 122 can send that score out to one or more entities 104.

The threat management platform 102 receives events, incidents, and alerts from the security management platforms 130. The detailed information may include attributes of the underlying events. These attributes can be used to link a relationship of the particular event and relevancy. The score engine 120 can determine a threat score for the respective threat observables that are customized for the individual entities based on their respective characteristic data.

In various examples, calculating the threat score can include considering security context to identify a threat level (e.g., a severity of the security occurrence). For example, security context can include information that describes something about the entity, a threat, a threat actor(s), actor's motivations, actor techniques, tactics, procedures, the overall threat level of a security occurrence, information about the global threat environment of the threat exchange community (e.g., increased activity of a particular type), and/or other useful information. Comparing the characteristic data with incoming security data and/or security context can be used to determine how critical a security occurrence is to an entity receiving a customized score. For instance, depending on hardware and/or computer-readable instruction components used by the entity, a security occurrence may be of greater concern to particular entities. Values can be associated with the scores based on an algorithm. In one example the threat scores can go from 0 to 100. A threat score of 0 can represent something that may be on a whitelist. A threat score of 100 can be considered something known malicious with a high level of confidence. Score values in between can be varying levels of confidence. Moreover, in some examples, the severity of an attack or threat can be used in calculating the score. Here, the threat score may represent a likelihood that if a threat observable associated with threat data is observed, a malicious behavior is associated. Other information/scores can also be used/developed, for example, a value of confidence for a threat.

In one example, threat score algorithms can take into account the frequency and/or confirmation of a threat observable from multiple entities. Further, certain entities can be ranked as providing more reliable data and can be weighted more in an algorithm used to generate the threat score. In the example, the first detection of the threat observable may generate a low threat score, while corroboration from a second entity can add to the confidence that the threat observable can be considered a threat. Further, additional occurrences and/or a frequency of the threat observable can be used. As noted herein, policies can be used to determine what information is used in generating threat scores for particular entities.

Further, as noted above, a rating of the submitter of the threat can be used as well. When a threat submitter with a better rating submits a threat observable or other threat data, the rating for the threat data can be higher or otherwise considered more useful/relevant. In one example, the submitter's rating can be used to weight what the threat score for threat data would be. In some examples, the threat submitter's rating can be used as a component in a formula to determine the threat score. As noted, the communication engine 122 can send out the threat data from a threat submitter 108 to entities 104. The entities 104 can provide feedback to the threat management platform 102 via the communication engine 122. As such, the communication engine can receive usage information from one or more of the entities 104.

In certain examples, usage information is information provided by a security management platform 130 about a use and/or non-use of the provided threat data. In one example, an entity can provide negative feedback (e.g., provide information that the data was incorrect, not useful, etc.). In another scenario, the feedback can be neutral (e.g., provide information that the data was duplicative, the information has not been used, etc.). In yet another scenario, the feedback can be positive (e.g., the information is useful; the information is useful and unique, etc.). The feedback can be automated so that a security management platform 130 that receives the threat data provides the information back to the rating engine 124 based on one or more rules. The rules can be customized. In one example, the rule can include providing feedback when the threat data is used. The feedback can include that the information was used and/or a usefulness of the information. The feedback can be provided in real-time. In certain examples, real-time can mean that the feedback is provided subject to a real-time constraint such as an operational deadline from event to system response. In this scenario, the event can be usage of the threat data and the system response can be considered the sending of usage data and/or other feedback to the threat management platform 102.

The rating engine 124 can receive the usage information/feedback and can update a rating for the threat submitter 108 based on the usage information/feedback. In certain examples, the rating represents a confidence that the threat submitter is submitting useful threat information. The rating can start at a base value and move up/down based on the feedback. In one example, the rating can be a numerical value from X to Y. The rating may be an integer and/or a floating value. The base value can be set based on a customized value, a value associated with a community that the submitter belongs to, a middle value between X and Y, etc. The feedback can be used to move the rating value more towards X or Y based on whether the feedback is positive, negative, or neutral. In various examples, the feedback can be based on the severity of the threat data (e.g., used severe threat information can be considered very positive feedback), usefulness of the threat data based on the usage information, uniqueness of the threat data compared to the usage information received from one of the other entities (e.g., unique threat data can be threat data that is provided first and/or earlier than other threat submitters), etc.

Security management platforms 130 receiving the threat scores of threat observables can perform security actions when threat observables are observed. For example, an intrusion prevention system (IPS) can block traffic from an attack source if the attack source based on the threat observable. In another example, brute force attacks on companies can be observed and the IP address can be provided to the threat management platform 102. The IP address can then be blocked by receiving security management platforms 130 based on algorithms particular to the respective receiving entities.

In some examples, the threat submitters can provide information anonymously while in other examples, threat submitters can provide information with their name associated. In one example, whether the submission is anonymous or not, the threat submitter can be known to the threat management platform 102. As such, even though the information is being provided anonymously, the information can be used to rate the anonymous submitter. In another example, the name of the threat submitter is associated with the submission and may be disseminated to the community. Anonymously submitted material may have a different weighting on the threat submitter's rating than information submitted with identification for the community. A threat submitter may desire to submit anonymously certain threat information that the threat submitter thinks the community may want to know, but may not desire to let others know of a vulnerability being attacked in their system.

The communication network 106 can use wired communications, wireless communications, or combinations thereof. Further, the communication network 106 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network 106 can be in the form of a direct network link between devices. Various communications structures and infrastructure can be utilized to implement the communication network(s).

By way of example, the security management platforms 130a-130n and threat management platform 102 communicate with each other and other components with access to the communication network 106 via a communication protocol or multiple protocols. A protocol can be a set of rules that defines how nodes of the communication network 106 interact with other nodes. Further, communications between network nodes can be implemented by exchanging discrete packets of data or sending messages. Packets can include header information associated with a protocol (e.g., information on the location of the network node(s) to contact) as well as payload information.

Figure 2:
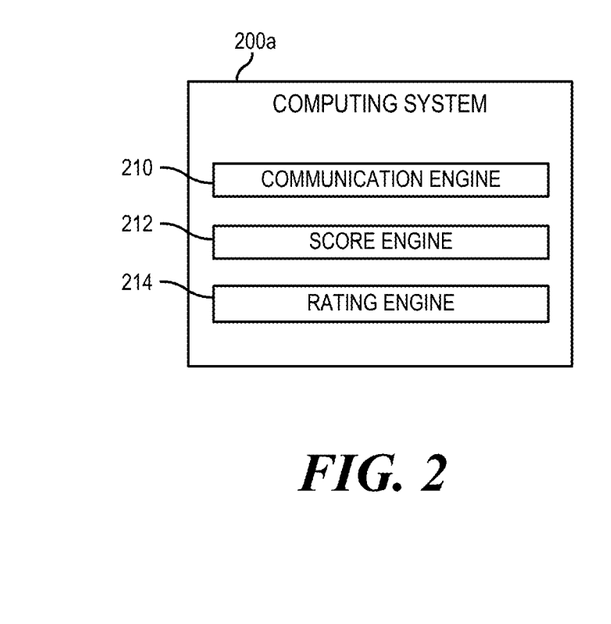
FIGS. 2 and 3 are block diagrams of computing systems capable of rating threat submitters in a threat exchange system, according to various examples.
Figure 3:
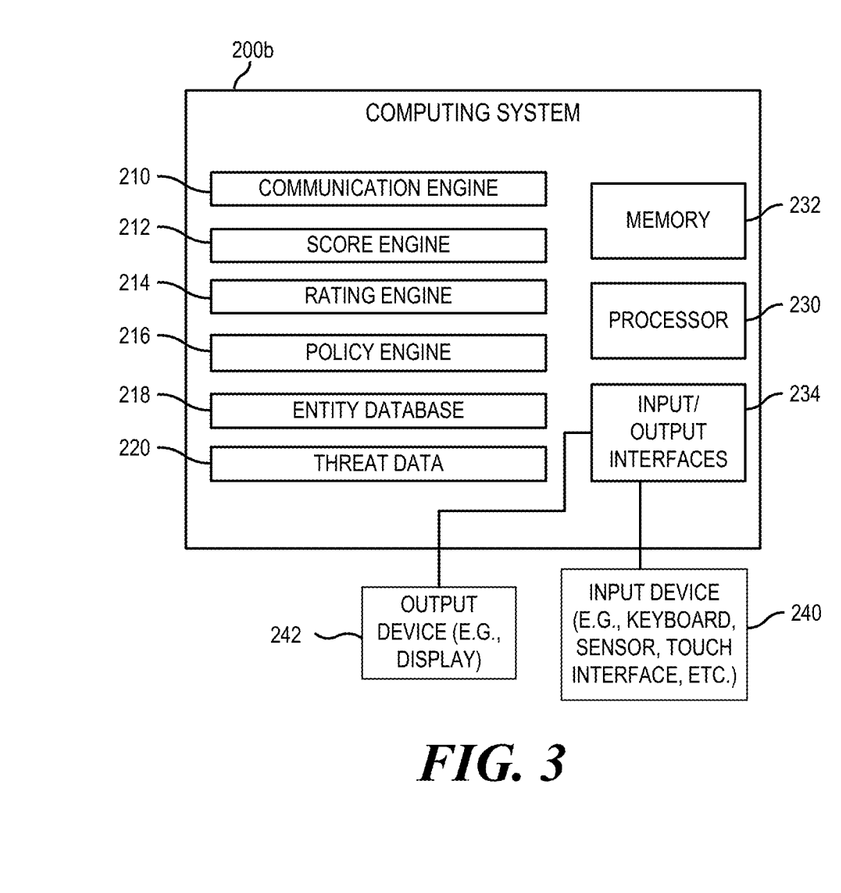

FIGS. 2 and 3 are block diagrams of computing systems capable of rating threat submitters in a threat exchange system, according to various examples. Computing systems 200a, 200b include components that can be utilized to rate threat submitters. The respective systems 200a, 200b may be a notebook computer, a desktop computer, a server, a workstation, or any other computing device that is capable of providing the features of the threat management platform 102.

The computing system 200 can include a communication engine 210 and/or module, a score engine 212 and/or module, and a rating engine 214 and/or module. Further, the computing system 200b can include a policy engine 216, an entity database 218, and a threat data database 220. The engines 210, 212, 214, 216 include hardware and/or combinations of hardware and programming to perform functions provided herein. Moreover, the modules (not shown) can include programing functions and/or combinations of programming functions to be executed by hardware as provided herein. When discussing the engines and modules, it is noted that functionality attributed to an engine can also be attributed to the corresponding module and vice versa. Moreover, functionality attributed to a particular module and/or engine may also be implemented using another module and/or engine.

The entity database 218 can include information about the respective entities 104a-104n (e.g., policies associated with the respective entities, characteristic data, associated categories, associated groups, associated attributes, etc.). The threat data 220 can include information about threat observables (e.g., events, patterns, identification tools, associated threat scores, etc.). The entity database 218 can further include rating information about the respective entities as threat submitters.

The communication engine 210 can be used to receive threat data from a threat submitter. The score engine 212 can then score the threat data for one or more entities. In some examples, the scores can be customized for particular entities based on rules (e.g., relevancy, community membership, etc.). The score can also be based on a rating of the threat submitter. The communication engine 210 can further be used to provide the score to one or more entities 104. The score can be provided based on analysis performed by the computing system 200.

The communication engine 210 can receive usage information/feedback from security management platforms of the entities. The feedback can be automated based on whether the security management platform uses the information. In some examples, the feedback is automated without user intervention (e.g., because the security management platform performed a security action without feedback from a user). In other examples, feedback from a user can be provided.

The rating engine 214 can update a rating for the threat submitter, for example, in the entity database 218 based on the usage data/feedback. As noted above, the rating can be updated based on at least one of a severity of the threat data, a usefulness of the threat data based on the usage information, and a uniqueness of the threat data compared to the usage information received from one or more of the entities.

A processor 230, such as a central processing unit (CPU) or a microprocessor suitable for retrieval and execution of instructions and/or electronic circuits can be configured to perform the functionality of any of the engines/modules described herein. In certain scenarios, instructions and/or other information, such as entity data and/or threat data, can be included in memory 232 or other memory. Input/output interfaces 234 may additionally be provided by the computing system 200b. For example, input devices 240, such as a keyboard, a sensor, a touch interface, a mouse, a microphone, etc. can be utilized to receive input from an environment surrounding the computing device 200b. Further, an output device 242, such as a display, can be utilized to present information to users. Examples of output devices include speakers, display devices, amplifiers, etc. Moreover, in certain embodiments, some components can be utilized to implement functionality of other components described herein. Input/output devices such as communication devices like network communication devices or wireless devices can also be considered devices capable of using the input/output interfaces 234.

Each module (not shown) may include, for example, hardware devices including electronic circuitry for implementing the functionality described herein. In addition or as an alternative, each module may be implemented as a series of instructions encoded on a machine-readable storage medium of computing system 200 and executable by processor 230. It should be noted that, in some embodiments, some modules are implemented as hardware devices, while other modules are implemented as executable instructions.

Figure 4:
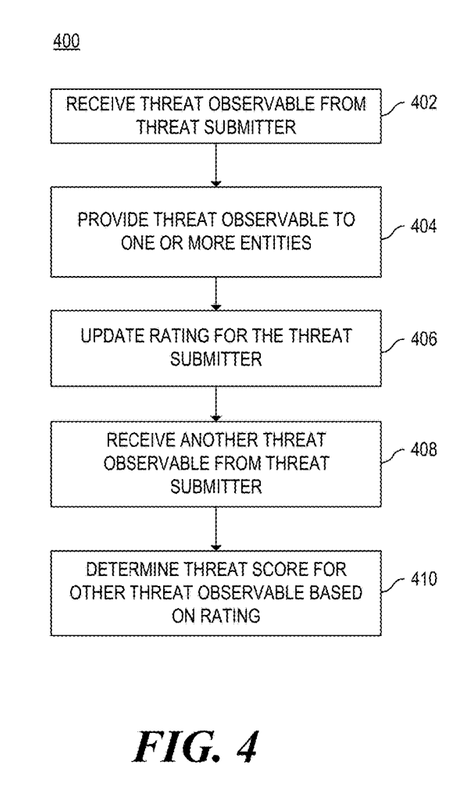
FIG. 4 is a flowchart of a method for updating a rating for a threat submitter, according to one example.

FIG. 4 is a flowchart of a method for updating a rating for a threat submitter, according to one example. Although execution of method 400 is described below with reference to computing system 200, other suitable components for execution of method 400 can be utilized (e.g., threat management platform 102, computing device 600, etc.). Additionally, the components for executing the method 400 may be spread among multiple devices. Method 400 may be implemented in the form of executable instructions stored on a machine-readable storage medium, such as storage medium 620, and/or in the form of electronic circuitry.

Method 400 may start at 402, where communication engine 210 receives threat observable information about a threat observable from a threat submitter. As noted, a threat observable is information that can be observed by a device that can be used to make a determination that something (e.g., an event, an action, an IP address, a device, a set of events, a pattern, etc.) is malicious. The information about the threat observable can include the threat observable as well as other information about the threat observable, such as any incidents it has been a part of, contextual information, etc. The score engine 212 can determine a score associated with the threat observable and may provide the information to one or more entities (404). These entities can provide feedback, such as usage information.

At 406, a rating engine 214 updates a rating for the threat submitter. As noted above, the rating can be set at one point at a baseline and then moved up/down based on information received about the submitter. The updating can be based on the feedback and/or based on other factors, such as time. As noted above, the rating represents a confidence that the threat submitter is submitting useful threat data. In one example, the rating is further based on an analysis of the threat observable and information received from at least one of the entities. Examples of feedback can include: a severity of the threat observable, a usefulness of the threat observable at the at least one of the entities, a uniqueness of the threat observable compared to the information received from the at least one of the entities, combinations thereof, etc. Usefulness can be evaluated on various metrics, for example timeliness. For example, data can be considered more useful if it is available during the time of an attack and can allow for more security measures to be taken.

In one example, the information received from the entity(ies) includes a sighting of the threat observable at the entity(ies). The information about the threat observable can be provided to the security management platform 130 of the respective entities. That information is used in sighting the threat observable at at least one of the entities. In one example, if the entity that observes the threat observable is rated as a threat submitter above a particular threshold, the rating of the threat submitter of the information is updated positively. This can be based on a correlation that a good submitter that positively provides feedback (e.g., seeing the threat observable), then another threat submitter that saw the same issue earlier should be rated higher. In some examples, the sighting entity can be in a community that does not directly receive information from the threat submitter, but can be used for correlation by seeing the same observable.

Moreover, in certain examples, feedback about the sighting can include additional information about the context in which the observable was seen. In one example, the additional information may include what type of systems have been affected by an incident caused by the threat observable. In another example, the information can include correlation information such as a connection with particular targets such as financial data (e.g., credit card or debit card data), medical records, personal information, intellectual property, etc. In yet another example, the feedback can also include whether the threat observable was seen with other threat observables. This information can be used for further correlation.

In one example, the qualitative analysis can positively update the threat submitter based on an analysis of the information provided and what it shows. For example, if the information provided by the threat submitter is analyzed by one or more of the threat community members/other entities in the threat community and shows that the information provided is targeted and severe, the threat submitter's rating can be positively updated. Typically, attacks towards single targets may be more severe than a target towards a community as a whole. The positive update can be based on the severity of the targeted attack.

At 408, the computing system 200 can receive information about another threat observable from the threat submitter. This can be a threat observable separate from the previous threat observable or linked in some way. This threat observable can be scored by the score engine 212 to determine a threat score for the other threat observable based, at least in part, on the rating (410). As noted above, the rating can be a numerical value, that when plugged in with other factors, can be used to determine the threat score. Further, in this example, the threat score represents a likelihood that if the threat observable is seen, a malicious threat behavior is associated. The severity of the maliciousness can also be reflected in the threat score. In one example, the threat score can be discounted based on a low rating of the threat submitter. In another example, the threat score can reflect additional confidence based on the rating.

Figure 5:
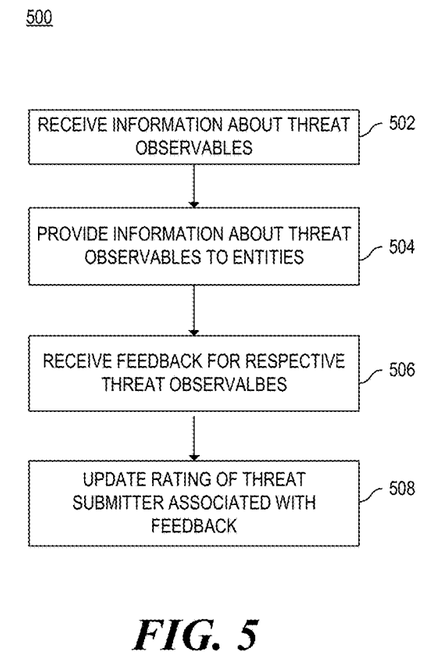
FIG. 5 is a flowchart of a method for updating a rating for a threat submitter based on feedback, according to one example.

FIG. 5 is a flowchart of a method for updating a rating for a threat submitter based on feedback, according to one example. Although execution of method 500 is described below with reference to computing device 600, other suitable components for execution of method 500 can be utilized (e.g., threat management platform 102, computing system 200, etc.). Additionally, the components for executing the method 500 may be spread among multiple devices. Method 500 may be implemented in the form of executable instructions stored on a machine-readable storage medium, such as storage medium 620 of FIG. 6, and/or in the form of electronic circuitry.

Figure 6:
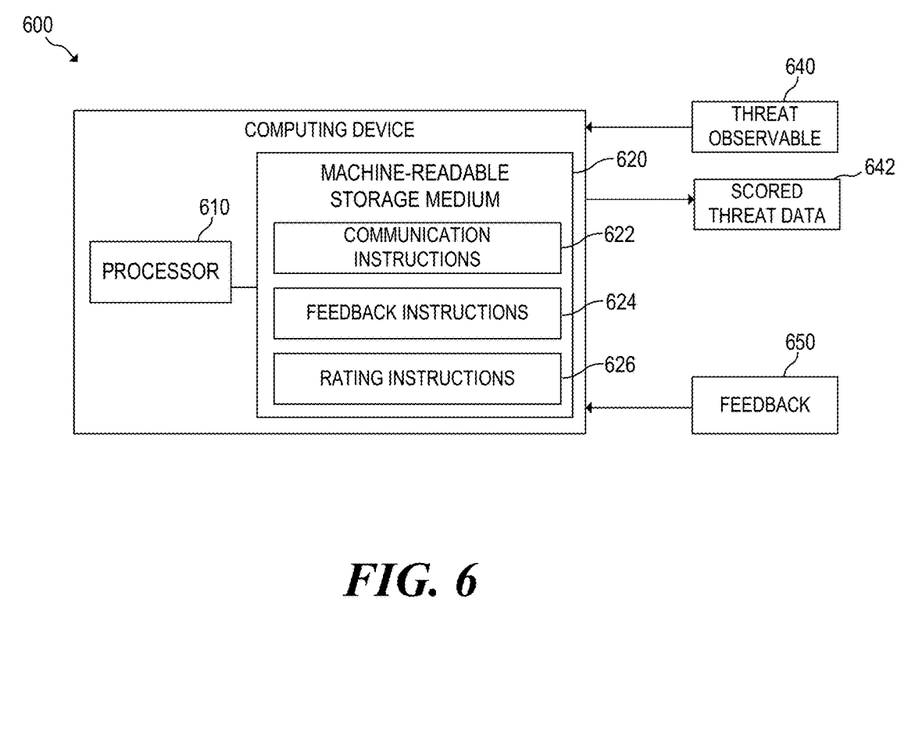
FIG. 6 is a block diagram of a computing device capable of rating threat submitters, according to one example.

At 502, the computing device 600 receives information about a plurality of threat observables 640 from a respective multiple threat submitters. Communication instructions 622 can be executed by processor 610 to receive and send information. The respective threat information about the threat observables respectively include at least one attribute about a respective threat associated with the threat observable. Examples of threat observables include IP addresses, domains, file hashes, etc.

At 504, the computing device 600 can provide information about the respective threat observables to one or more entities. The information can be in the form of scored threat data 642.

The computing device 600 can also receive respective feedback 650 from at least one of the entities about the respective threat observables (506). As noted above, the feedback can be received in real-time in certain examples. Feedback instructions 624 can be used to process the feedback. This feedback can be used to update an entity database and/or threat data as described above.

At 508, rating instructions 626 can be executed to update a rating of one of the threat submitters associated with the respective feedback. Other threat submitters' ratings can be similarly updated based on their respective feedback. The rating can be initiated at a baseline as described above. The rating can represent a confidence that the threat submitter is submitting useful threat data. In one example, the baseline can reflect an analysis by a controlling entity of the threat exchange community and/or threat management platform.

The baseline can be initiated higher for certain entities with large capabilities compared to smaller entities with less security experts/resources.

In one example, the rating can be positively updated for various reasons stated above. For example, the rating can be positively updated if the feedback indicates that the threat observable was used by a security management platform to discover a threat. In some examples, the feedback is received directly from the security management platform.

In another example, the rating can be updated negatively for various reasons. In one example, if the feedback indicates that the associated threat observable was incorrect or did not associate with malware, the rating can be impacted negatively. In another example, the feedback can include that the threat observable was not observed or not used, this can also, in certain scenarios reflect negatively on the rating.

In some examples, the rating can be further based on a uniqueness of the threat observable submitted by the submitter. For example, if the threat submitter is the only submitter/first submitter of a threat observable, that threat submitter's rating may become more positively updated when others see/confirm the threat observable. As such, the threat submitter may gain a reputation rating for being an early submitter. Early submission/discovery is useful for various reasons, including that the submitter may be an early target in attacks and can therefore be considered a credible source of early security information before others see it. In a similar example, the threat submitter may be better at detecting things that other entities have not yet detected. There can be various reasons why an entity is an early target, for example, they may have high value assets or their security posture is vulnerable. For example, the entity may be targeted because of a content delivery network it uses.

In other examples, the update of the rating can further be based on another rating of another threat submitter associated with a high rating. For example, if the threat submitter submits a threat observable that is also seen by another threat submitter with a high rating, it can be used to confirm that the threat submitter is submitting useful information. In some examples, the high rating can be based on a numerical rating of the threat submitters and a comparison to a threshold. In other examples, the high rating may additionally or alternatively be associated with a tag. For example, a government entity may be given a high rating tag.

In some examples, the rating can further be associated with a category. Categories can be associated with one or more threat communities. Moreover, multiple ratings may be provided for each entity based on the categories. Categories can include types of industries, types of information protected, etc. For example, categories can include governments, location (e.g., country), financial sector, personal information sector (e.g., social websites), intellectual property information protected, financial information protected, personal information protected, medical information protected, etc. The feedback can be processed and ratings can be adjusted based on what category or categories are associated with the feedback (e.g., the entity providing feedback may be associated with a financial sector, personal information protected, and financial information protected). As such, the rating for one category can be updated based on feedback associated with the category while the rating for another category is not updated based on that feedback. With this approach, the threat submitter's rating for the financial sector may be considered good, but the threat submitter's rating for a social website sector may not be as good. The rating for the categories can be updated as described herein, but where the ratings are specialized for the categories.

The computing device 600 can also determine the score of other threat observables as the threat observables come in based, at least in part, on the ratings. In some examples, the ratings used for scoring can be different based on whether the entity intended to receive the score is part of a category and/or set of categories. Further, in some examples, the threat submitters may be associated with a general rating and may also be associated with one or more specific ratings. One or more of these ratings can be used in an algorithm determining the threat score of the respective threat observables.

FIG. 6 is a block diagram of a computing device capable of rating threat submitters, according to one example. The computing device 600 includes, for example, a processor 610, and a machine-readable storage medium 620 including instructions 622, 624, 626. Computing device 600 may be, for example, a security appliance, a computer, a workstation, a server, a notebook computer, or any other computing device capable of providing the functionality described herein.

Processor 610 may be, at least one central processing unit (CPU), at least one semiconductor-based microprocessor, at least one graphics processing unit (GPU), other hardware devices suitable for retrieval and execution of instructions stored in machine-readable storage medium 620, or combinations thereof. For example, the processor 610 may include multiple cores on a chip, include multiple cores across multiple chips, multiple cores across multiple devices (e.g., if the computing device 600 includes multiple node devices), or combinations thereof. Processor 610 may fetch, decode, and execute instructions 622, 624, 626 to implement methods 400 and/or 500. As an alternative or in addition to retrieving and executing instructions, processor 610 may include at least one integrated circuit (IC), other control logic, other electronic circuits, or combinations thereof that include a number of electronic components for performing the functionality of instructions 622, 624, 626.

Machine-readable storage medium 620 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 620 may be encoded with a series of executable instructions for determining customized threat scores.

What is claimed is:

1. A non-transitory machine-readable storage medium storing instructions that, if executed by at least one processor of a computing system, cause the computing system to:
   receive information about a threat observable from a threat submitter device via a network, wherein the threat observable is detected by the threat submitter device;
   provide threat data about the threat observable to a plurality of participant devices in a threat exchange system;
   receive usage information from at least one participant device of the plurality of participant devices about the threat data, the usage information generated by rules-based automation of the at least one participant device and indicating a usage of the threat data by the at least one participant device; and
   update, by a rating engine, a rating of the threat submitter device based on the received usage information generated by the rules-based automation of the at least one participant device.

2. The non-transitory machine-readable storage medium of claim 1, further comprising instructions that, if executed by the at least one processor, cause the computing system to:
   positively update the rating of the threat submitter device in response to a determination that the usage information indicates that the threat data was used by the at least one participant device to discover a threat.

3. The non-transitory machine-readable storage medium of claim 1, further comprising instructions that, if executed by the at least one processor, cause the computing system to:
   negatively update the rating of the threat submitter device in response to a determination that the usage information indicates at least one of: that
   the threat data was not used by the at least one participant device; and
   the threat data was incorrect.

4. The non-transitory machine-readable storage medium of claim 1, wherein the rating is associated with a category, wherein the usage information is received from one of a set of participant devices that are also associated with the category.

5. The non-transitory machine-readable storage medium of claim 4, wherein another rating associated with another category is not updated based on the usage information.

6. The non-transitory machine-readable storage medium of claim 1, wherein the rating represents a confidence that the threat submitter device is submitting useful threat data.

7. The non-transitory machine-readable storage medium of claim 6, wherein the rating is further based on a uniqueness of the threat data submitted by the threat submitter device.

8. The non-transitory machine-readable storage medium of claim 6, wherein the update of the rating is further based on another rating of another threat submitter device associated with a high rating.

9. The non-transitory machine-readable storage medium of claim 1, further comprising instructions that, if executed by the at least one processor, cause the computing system to:
   leave the rating unchanged in response to a determination that the threat data was duplicative.

10. A method comprising:
    receiving, by a threat management device, threat observable information about a threat observable from a threat submitter device via a network, wherein the threat observable is detected by the threat submitter device;
    providing, by the threat management device, the threat observable information to a plurality of participant devices in a threat exchange system;
    receiving, by the threat management device, usage information from at least one participant device of the plurality of participant devices about the threat observable information, the usage information automatically generated by the at least one participant device and indicating a usage of the threat observable information by the at least one participant device;
    updating, by a rating engine of the threat management device, a rating for the threat submitter device based on the usage information received from the at least one participant device, wherein the updated rating represents a confidence that the threat submitter device is submitting useful threat data based on an analysis of the usage information received from the at least one participant device;

receiving, by the threat management device, other threat observable information about another threat observable from the threat submitter device;

determining, by the threat management device, a threat score for the other threat observable based at least in part on the updated rating for the threat submitter device.

11. The method of claim 10, wherein the rating is positively updated in response to a determination that the usage information indicates that the threat data was used by the at least one participant device.

12. The method of claim 10, wherein the rating is negatively updated in response to a determination that the usage information indicates that the threat data was not used by the at least one participant device.

13. A computing system comprising:
a processor;
a communication engine executed by the processor to receive threat data from a threat submitter device via a network;
a score engine executed by the processor to score the threat data for at least one participant device in a threat exchange system, wherein the communication engine is further to provide the score to the at least one participant device;
wherein the communication engine is further to receive usage information of the threat data the usage information automatically generated by the at least one participant device and indicating a usage of the threat data by the at least one participant device;
a rating engine executed by the processor to update a rating for the threat submitter device based on the usage information generated by the rules-based automation of the at least one participant device.

14. The computing system of claim 13, wherein the rating represents a confidence that the threat submitter device is submitting useful threat information to the threat exchange system, and wherein the threat score represents a likelihood that if a threat observable associated with the threat data is observed, a malicious behavior has occurred.

15. The computing system of claim 13, wherein the rating is positively updated in response to a determination that the usage information indicates that the threat data was used by the at least one participant device.

16. The computing system of claim 13, wherein the rating is negatively updated in response to a determination that the usage information indicates that the threat data was not used by the at least one participant device.

17. The computing system of claim 13, wherein the usage information is generated without user intervention by rules-based automation of the at least one participant device.

18. The computing system of claim 13, wherein the rating is unchanged in response to a determination that the threat data was duplicative.

19. The method of claim 10, further comprising:
generating, by rules-based automation of the at least one participant device, the usage information without user intervention.

20. The method of claim 10, further comprising:
determining, by the at least one participant device, that the threat data is duplicative; and
in response to determining that the threat data is duplicative, leaving the rating unchanged.

* * * * *